(12) United States Patent
Gorris

(10) Patent No.: US 9,918,489 B2
(45) Date of Patent: Mar. 20, 2018

(54) FOOD-BASED SUPPLEMENT DELIVERY SYSTEM

(76) Inventor: Mark Gorris, Saint Louis, MO (US)

( * ) Notice: Subject to any disclaimer, the term of this patent is extended or adjusted under 35 U.S.C. 154(b) by 960 days.

(21) Appl. No.: 12/337,371

(22) Filed: Dec. 17, 2008

(65) Prior Publication Data

US 2010/0151108 A1   Jun. 17, 2010

(51) Int. Cl.
| | |
|---|---|
| *A23L 33/105* | (2016.01) |
| *A23L 7/117* | (2016.01) |
| *A23L 7/126* | (2016.01) |
| *A23L 21/25* | (2016.01) |

(52) U.S. Cl.
CPC ............ *A23L 33/105* (2016.08); *A23L 7/117* (2016.08); *A23L 7/126* (2016.08); *A23L 21/25* (2016.08)

(58) Field of Classification Search
CPC .......... A23L 1/08; A23L 1/164; A23L 1/1643; A23L 1/3002; A23L 27/14; A23L 7/00; A23L 7/10
USPC ........................................ 426/618, 625, 638
See application file for complete search history.

(56) References Cited

U.S. PATENT DOCUMENTS

| | | | |
|---|---|---|---|
| 502,378 A | 8/1893 | Ford et al. | |
| 2,610,914 A | 9/1952 | Millard et al. | |
| 4,624,856 A * | 11/1986 | Vanderveer | A21D 2/183 426/331 |
| 4,737,367 A | 4/1988 | Langer et al. | |
| 4,859,477 A * | 8/1989 | Augustine et al. | 426/103 |
| 4,931,280 A | 6/1990 | Wood et al. | |
| 5,015,477 A | 5/1991 | Wood et al. | |
| 5,093,146 A * | 3/1992 | Calandro | A23L 1/0522 426/549 |
| 5,422,132 A | 6/1995 | Caden et al. | |
| 5,447,735 A | 9/1995 | Miller | |
| 5,492,710 A | 2/1996 | Seyam | |
| 5,618,517 A * | 4/1997 | Miskewitz | 424/48 |
| 6,033,709 A * | 3/2000 | Delrue | A23L 7/198 426/506 |
| 6,051,236 A | 4/2000 | Portman | |
| 6,132,199 A | 10/2000 | Chierici et al. | |
| 6,207,638 B1 | 3/2001 | Portman | |

(Continued)

FOREIGN PATENT DOCUMENTS

| | | |
|---|---|---|
| CA | 2595096 A1 | 1/2009 |
| CA | 2642184 A1 | 4/2010 |

(Continued)

OTHER PUBLICATIONS

Vigil. 2007. Organic Agave: the honey substitute. Accessed online: http://wewantorganicfood.com/2007/07/15/organic-agave-the-honey-substitute/.*

(Continued)

*Primary Examiner* — Jeffrey Mornhinweg
(74) *Attorney, Agent, or Firm* — Lewis Rice LLC

(57) ABSTRACT

A cookie or other food product which is designed to deliver a larger dose of cinnamon to a human user without significant introduction of food items detrimental to cinnamon's expected medicinal action and without an unpleasant taste sensation. The cookie is designed to be chewed as opposed to swallowed and the flavoring of the cinnamon is intended to enhance the cookie as opposed to the flavoring of the cinnamon being covered up or concealed by other flavorings.

20 Claims, 1 Drawing Sheet

(56) References Cited

U.S. PATENT DOCUMENTS

| | | | |
|---|---|---|---|
| 6,280,782 B1* | 8/2001 | Hahn | A21D 10/025 426/496 |
| 6,461,634 B1 | 10/2002 | Marshall | |
| 6,468,569 B1* | 10/2002 | Dunker | A21D 6/001 426/293 |
| 6,528,104 B1 | 3/2003 | Jindra et al. | |
| 6,569,445 B2 | 5/2003 | Manning et al. | |
| 6,723,357 B1 | 4/2004 | Shifferaw et al. | |
| 6,770,316 B2 | 8/2004 | Jindra et al. | |
| 6,818,234 B1 | 11/2004 | Nair et al. | |
| 7,067,150 B2 | 6/2006 | Farber et al. | |
| 7,125,571 B2 | 10/2006 | Organ et al. | |
| 7,128,932 B2 | 10/2006 | Bombardelli et al. | |
| 7,201,928 B1 | 4/2007 | Huang et al. | |
| 7,361,370 B2 | 4/2008 | Bombardelli et al. | |
| 7,384,654 B2 | 6/2008 | Menon et al. | |
| 7,384,656 B2 | 6/2008 | Menon et al. | |
| 7,416,750 B1 | 8/2008 | Vrablic et al. | |
| 7,504,118 B2 | 3/2009 | Miller et al. | |
| 7,923,044 B2 | 4/2011 | Bias | |
| 7,943,164 B2 | 5/2011 | Ahrens et al. | |
| 7,977,319 B1 | 7/2011 | Levine | |
| 8,057,834 B2 | 11/2011 | Kwitek | |
| 2001/0002269 A1 | 5/2001 | Zhao | |
| 2002/0012722 A1 | 1/2002 | Prosise et al. | |
| 2002/0012733 A1 | 1/2002 | Kester et al. | |
| 2003/0190398 A1* | 10/2003 | Reuter | A21D 10/025 426/549 |
| 2004/0028751 A1 | 2/2004 | Mae et al. | |
| 2004/0126477 A1 | 7/2004 | Coleman et al. | |
| 2004/0137112 A1 | 7/2004 | Katz et al. | |
| 2004/0224035 A1 | 11/2004 | Miller et al. | |
| 2004/0265472 A1 | 12/2004 | Corfman et al. | |
| 2005/0147620 A1 | 7/2005 | Bozicevic | |
| 2005/0226960 A1* | 10/2005 | Boice | A23L 33/26 426/72 |
| 2005/0249859 A1 | 11/2005 | Zukerman et al. | |
| 2005/0255218 A1* | 11/2005 | Green et al. | 426/619 |
| 2006/0013361 A1 | 1/2006 | Fehre et al. | |
| 2006/0013903 A1 | 1/2006 | Romero et al. | |
| 2006/0088574 A1 | 4/2006 | Manning et al. | |
| 2006/0141009 A1 | 6/2006 | Huron et al. | |
| 2006/0251736 A1 | 11/2006 | Hayes et al. | |
| 2006/0263457 A1 | 11/2006 | Zhang et al. | |
| 2006/0269617 A1 | 11/2006 | Giampapa | |
| 2006/0286182 A1 | 12/2006 | Patel | |
| 2007/0020369 A1* | 1/2007 | Roy | A21D 2/16 426/549 |
| 2007/0196520 A1 | 8/2007 | Lin et al. | |
| 2007/0212433 A1 | 9/2007 | Smidt et al. | |
| 2007/0218110 A1 | 9/2007 | Goetz | |
| 2007/0237845 A1 | 10/2007 | Lin et al. | |
| 2007/0237880 A1 | 10/2007 | Coleman et al. | |
| 2007/0254047 A1 | 11/2007 | Hayes et al. | |
| 2007/0264314 A1 | 11/2007 | Kracke | |
| 2007/0292540 A1 | 12/2007 | Gow et al. | |
| 2008/0044445 A1 | 2/2008 | Kobayashi et al. | |
| 2008/0075759 A1 | 3/2008 | Paulsen et al. | |
| 2008/0085343 A1 | 4/2008 | Petty et al. | |
| 2008/0102137 A1 | 5/2008 | Guffey | |
| 2008/0102183 A1* | 5/2008 | Christensen | A21D 2/165 426/549 |
| 2008/0152725 A1 | 6/2008 | Giordano et al. | |
| 2008/0175928 A1 | 7/2008 | Jochim et al. | |
| 2008/0207717 A1 | 8/2008 | Vrablic et al. | |
| 2008/0213440 A1* | 9/2008 | Harvey | A23L 27/30 426/289 |
| 2008/0233245 A1 | 9/2008 | White et al. | |
| 2008/0241318 A1 | 10/2008 | Minus | |
| 2008/0254144 A1 | 10/2008 | Banayan | |
| 2009/0004306 A1 | 1/2009 | Pridemore et al. | |
| 2009/0004334 A1 | 1/2009 | Nair | |
| 2009/0011078 A1 | 1/2009 | Johnson | |
| 2009/0123579 A1 | 5/2009 | Hirsch | |
| 2009/0162499 A1 | 6/2009 | McArdle et al. | |
| 2009/0180971 A1 | 7/2009 | Martinez Marcos | |
| 2009/0215885 A1 | 8/2009 | Bendheim et al. | |
| 2009/0252758 A1 | 10/2009 | Mazed et al. | |
| 2009/0252796 A1 | 10/2009 | Mazed et al. | |
| 2010/0021533 A1 | 1/2010 | Mazed et al. | |
| 2010/0028469 A1 | 2/2010 | Alberte et al. | |
| 2010/0113598 A1 | 5/2010 | Cleveland | |
| 2010/0119498 A1 | 5/2010 | Hastings | |
| 2010/0178413 A1 | 7/2010 | Gorris | |
| 2010/0215805 A1 | 8/2010 | Hahn | |
| 2011/0064833 A1 | 3/2011 | Patell et al. | |

FOREIGN PATENT DOCUMENTS

| | | |
|---|---|---|
| EP | 0 372 596 A2 | 6/1990 |
| EP | 1676572 A1 | 7/2006 |
| WO | 2000/044367 A2 | 8/2000 |
| WO | 2005/074959 A1 | 8/2005 |
| WO | 2005/0099455 A1 | 10/2005 |
| WO | 2005/110448 A2 | 11/2005 |
| WO | 2006/020091 A2 | 2/2006 |
| WO | 2006/030426 A1 | 3/2006 |
| WO | 2006/110491 A2 | 10/2006 |
| WO | 2006/127779 A2 | 11/2006 |
| WO | 2007/001685 A2 | 1/2007 |
| WO | 2007/056176 A2 | 5/2007 |
| WO | 2007/098240 A2 | 8/2007 |
| WO | 2007/109804 A2 | 9/2007 |
| WO | 2008/000063 A1 | 1/2008 |
| WO | 2008/055363 A1 | 5/2008 |
| WO | 2008/094877 A2 | 8/2008 |
| WO | 2008/098162 A1 | 8/2008 |
| WO | 2008100727 A2 | 8/2008 |
| WO | 2009/015459 A1 | 2/2009 |
| WO | 2010/048701 A1 | 5/2010 |
| WO | 2010/048705 A1 | 5/2010 |

OTHER PUBLICATIONS

Fitness and Freebies. 2002. Sugar and Sugar Substitutes. Accessed online: http://web.archive.org/web/20020817232321/http://www.fitnessandfreebies.com/fitness/sugar.html.*
"Ginger Chews Original," http://www.puritan.com/herb-products-f-to-m-035/ginger-chews-original-029231?scid=6648&cm_mmc=NexTag-_-Herb%20Products%20%28F%20to%20M%29-_-ginger-chews-original-_-029231, undated, one page.
"Solaray Ginger Trips 60 wafrs," Allstarhealth.com, http://www.allstarhealth.com/f/solaray-ginger_trips.htnn, printed on Apr. 4, 2010, 2 pages.
"Solaray Ginger Trips," Vitaminshoppe.com, http://www.vitaminshoppe.com/store/en/browse/sku_detail.jsp?id=SO-2010&sourceType=cs&source=NT&cm_mmc=Shopping%20Engines-_-nextag-_-Ginger%20Trips%20-%2030%20Gum-_-SO-2010&srccode=cii_9324560&cpncode=19-34578394-2, printed on Apr. 4, 2010, 4 pages.
"Ginger Chews Orange," VitaminLife.com, http://www.vitaminlife.com/product-exec/product_id/58309/nm/Ginger+Chews+Orange, printed on Apr. 4, 2010, 2 pages.
"Cranberry Chews," Finest Natural, undated, 2 pages (front and back of product box).
Baker, J. B., "Cinnamon Warning: Update," Carb Wars Blog, http://carbwars.blogspot.com/2008/09/cinnamon-warning-update.html, Sep. 8, 2008, 5 pages.
"Orange Peel—Cholesterol Fighter," http://www.aphroditewomenshealth.com/news/20040504004516_health_news.shtml, Jun. 4, 2004, 2 pages.
"CherryFlex FruitFast Bars," http://www.brownwoodacres.com/cherryflex_fruit_bars.php, printed on Apr. 4, 2010, 4 pages.
"Cinnamon orange peel," Ayala's herbal water, http://www.herbalwater.com/flav_cinnamon.html, printed on Apr. 4, 2010, 1 page.
"Baobab fruit approved as food ingredient in US," Nutraingredients-usa.com, http://www.nutraingredients-usa.com/content/view/print/259574, printed on Apr. 4, 2010, 2 pages.

(56) References Cited

OTHER PUBLICATIONS

"Baobab Fruit Powder," http://www.alaafiaholistic.com/products.html, printed on Apr. 4, 2010, 1 pages.
"Mock Apple Pie," http://www.exploratorium.edu/cooking/seasoning/kitchn/recipe-moc . . . , undated, 1 page.
"Your Bar Lets Customers Put Their Own Personal Touches on Nutrition Bars, Shakes," Nutrition Business Journal, http://subscribers.nutritionbusinessjournal.com/healthy-foods/10101-youbar-personal-touch/wall.html?return=http://subscribers.nutritionbusinessjournal.com/healthy-foods/10101-youbar-personal-touch/index.html, Oct. 1, 2008, 1 page.
"YouBar Launches You Cookie—Fully Customized Cookies," YouBar, http://www.youbars.com/you_blog/wordpress/, Nov. 30, 2009, 13 pages.
"Craft-A-Cookie," You Cookie, http://youbars.com/craftacookie, printed on Apr. 8, 2010, 14 pages.
"About You Cookie," You Cookie, http://youbars.com/aboutus_cookie, printed on Apr. 8, 2010, 5 pages.
"Build-A-Bar," YourBar, http://youbars.com/buildabar, printed on Apr. 8, 2010, 10 pages.
"The Official Website of the Glycemic Index and GI Database," http://www.glycemicindex.com/, printed on Apr. 8, 2010, 2 pages.
JP, "Cinnamon and Health," Healthy Fellow Your Natural Health Critic, http://www.healthyfellow.com/146/cinnamon-and-health/, Feb. 21, 2009, 7 pages.
International Search Report, International Patent Application No. PCT/US09/68447, dated Jun. 14, 2010, 15 pages.
Hlebowicz, J., et al., "Effect of cinnamon on postprandial blood glucose, gastric emptying and satiety in healthy subjects," The American Journal of Clinical Nutrition, 2007, p. 1552-1556, vol. 85, No. 6.
Day, C., "Are herbal remedies of use in diabetes?", Diabetic Medicine, Jan. 2005, p. 10-12, vol. 22, No. S1.
Khan, A., et al., "Cinnamon Improves Glucose and Lipids of People With Type 2 Diabetes," Diabetes Care, Dec. 2003, p. 3215-3218, vol. 26, No. 12.
McBride, J., "Cinnamon Extracts Boost Insulin Sensitivity," Agricultural Research, Jul. 2000, p. 21.
Jones, W., "Can Eating Cinnamon Help With Your Diabetes?", Unarchived Articles, http://articles.webraydian.com/article1378-Can_Eating_Cinnamon_Help_with_Your_Diabetes.html, Feb. 11, 2007, p. 1-3.
Shomon, M., et al., "Cinnamon: Help for Insulin Resistance and Weight Loss Popular and Flavorful Spice is New Aid in the Battle Against Buddha Belly/Belly Fat," http://www.thyroid-info.com/articles/cinnamon.htm, 2007, p. 1-3.
"Fig Bars," Barbara's Bakery, http://www.worldpantry.com/cgi-bin/ncommerce3/CategoryDisplay?cgmenbr=587770&cgrfnbr=881909 and http://www.worldpantry.com/cgi-bin/ncommerce3/ProductDisplay?prmenbr=587770&prrfnbr=892442&pcgrfnbr=881909, 4 pages.
"Germany to clamp down on cinnamon supplements," Nutraingredients.com, http://www.nutraingredients.com/Regulation/Germany-to-clamp-down-on-cinnamon-supplements, Nov. 16, 2006, one page.
"Cinnamon boosts brain activity," Nutraingredients.com, http://www.nutraingredients.com/Research/Cinnamon-boosts-brain-activity, Apr. 6, 2004, one page.
"Santa Fe Farms Fat-Free Ginger Cookies," Josephs Lite Cookies, http://www.josephslitecookies.com/index.cfm?method=Shopping_detail&productID=23&categoryID=8&parentCatID=2, printed on Jul. 9, 2008, one page.
"Dr. Siegal's Cookie Diet," http://www.cookiedietonline.com/cd_pages/about.php, 2007, two pages.
"Archway Home Style Cookies, Fat Free Cinnamon Honey Hearts," Archway Cookies, LLC, http://www.thedailyplate.com/nutrition-calories/food/archway-cookies-llc/archway-home-style-cookies- . . . , printed on Jul. 10, 2008, one page.
"Adora calcium supplements in premium chocolate," http://adoracalcium.com/, printed on Nov. 11, 2008, one page.

Mendosa, D., Revised International Table of Glycemic Index (GI) and Glycemic Load (GL) Values—2002, undated, one page.
"How much does 1/4 teaspoon of cinnamon weigh," Convert-Me.com—online units conversion, http://www.convert-me.com/en/bb/viewtopic.php?t=280, two pages, printed on Nov. 18, 2011.
"Health Benefits of Cinnamon Oil," Organic Facts, http://www.organicfacts.net/organic-oils/natural-essential-oils/health- . . . , three pages, printed on Nov. 18, 2011.
"Frequently Asked Questions," International Chewing Gem Association (ICGA), http://www.gumassociation.org/default.aspx?Cat=5, two pages, printed on Nov. 30, 2011.
Parthasarathy, V., et al., "Chemistry of Spices", 2008, 445 pages, CAB International.
"Taste of Home," http://web.archive.org/web/2008120464756/http://www.tasteofhome.com/healthy/receipe, Dec. 4, 2008, four pages.
"Cooking Done Light," http://web.archive.org/web/20071221032040/http://cookingdonelight.com/blog/2007/09/1 . . . , Dec. 21, 2007, seven pages.
Sahelian, M.D., Ray, "Stevia—Cooking with Nature's No Calorie Sweetner," http://web.archive.org/web/1991005183659/http://www.raysahalian.com/stevia.html, 1998, 3 pages.
"Better Health Research," http://www.betterhealthresearch.com/special-report/stevia-the-safe-natural-sweetner, published on Nov. 17, 2008, two pages.
La Ferla, B., "2.1.2 Flavors of the Terpene Family," Organic and Biomolecular Chemistry—vol. II—Chemistry of Nutraceutics, Flavors, Dyes and Additives, 2006, one page.
"Tropical Hibiscus Super Tea Booster," http://www.republicoftea.com/tropical-hibiscus-super-tea-booster/p/V20057, printed on Oct. 2, 2014, 2 pages.
"Acai Green Super Tea Booster," http://www.republicoftea.com/acai-green-super-tea-booster/p/V20058, printed on Oct. 2, 2014, 2 pages.
"Double Dark Chocolate Mate Super Tea Booster," http://www.republicoftea.com/double-dark-chocolate-mate-super-tea-booster/p/V20056, printed on Oct. 2, 2014, 2 pages.
"Cinnamon Bark (*Cinnamomum cassia*," http://webarchive.org/web/20060430234428/http://www.desertbloomherbs.com/monograph . . . , printed on Jun. 11, 2014, two pages.
"The Perfect Snaque," http://www.theperfectsnaque.com/products.html, printed on Oct. 2, 2014, one page.
"Glyconutrients," http://www.mskcc.org/cancer-care/herb/glyconutrients, 2014, printed on Sep. 18, 2014, two pages.
"Food starches—instant," Tate & Lyle, http://www.tateandlyle.com/ingredientsandservices/chooseaningredi . . . , printed on Jun. 26, 2012, two pages.
"Bonavitas Brings Benefits of Cinnamon to Recovery Drink R12 Boasts One Full Teaspoon of the Powerful Spice in Every Serving," www.bonavitas.com, May 16, 2011, two pages.
"Modified starches," Tate & Lyle, www.amlugroup.com, undated, 24 pages.
Let's Make: Spicy Cinnamon [Bodega] Candy https://brooklynbrainery.com/blog/let-s-make-spicy-cinnamon-bodega-candy, printed Aug. 4, 2016.
Baking Ingredient Conversions http://dish.allrecipes.com/baking-ingredient-conversions/, printed Aug. 4, 2016.
Keith Lindblom, Flavor Chemistry Research, USDA ARS Western Regional Research Center, American Chemical Society Chemistry for Life, Aug. 29, 2013, pp. 1-4.
Richard Hall et al, Recent Progress in Consideration of Flavoring Ingredients Under the Food Additives Amendment III GRAS Substances; Food Technology Journal of the Institute of Food Technologies, 1965, vol. 19 No. 2.
Pasupuleti Visweswara Rao et al, Cinnamon: A Multifaceted Medicinal Plant, Evidence-Based Complementary and Alternative Medice, vol. 2014, Article ID 642942, 12 pages.
Cinnamaldehyde (040506) Fact Sheet, Issued Oct. 2008, Ombudsman, Biopesticides and Pollution Prevention Division, Office of Pesticide Programs, Environmental Protection Agency.

\* cited by examiner

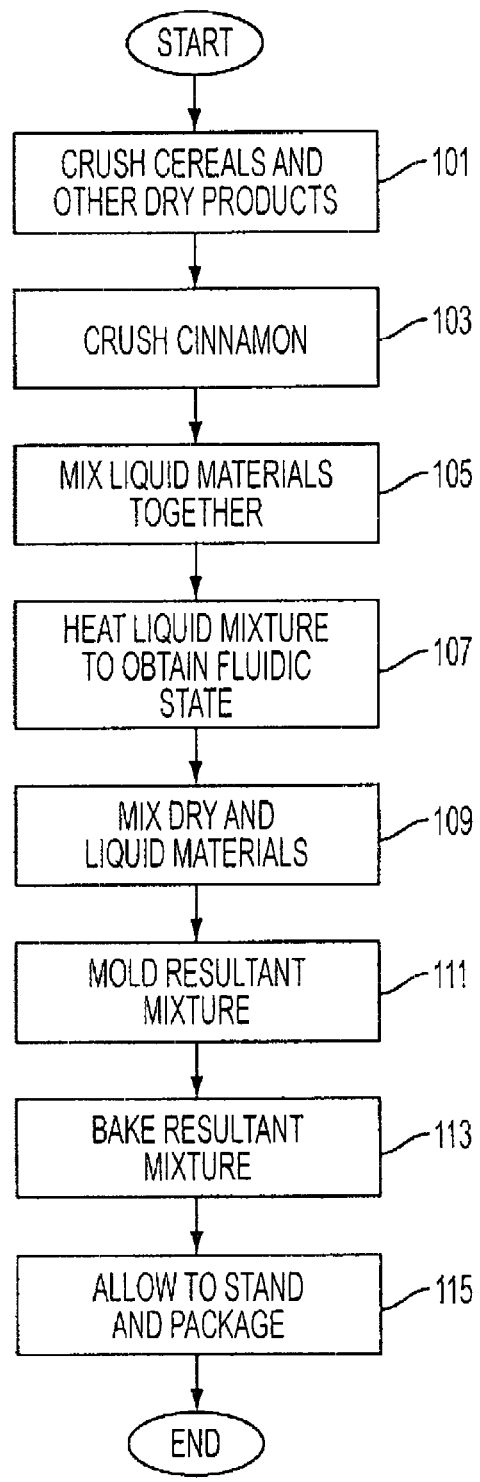

FOOD-BASED SUPPLEMENT DELIVERY SYSTEM

BACKGROUND OF THE INVENTION

1. Field of the Invention

This disclosure relates to the field of delivery mechanisms for supplements, such as nutritional supplements or other materials thought to have medicinal value, which delivery mechanisms comprise placing the supplement in a food-based substrate which is designed to enhance the supplement.

2. Description of Related Art

It is an old adage in medicine that the only difference between a medicine and a poison is in the amount consumed. Recent medical science continues to confirm this general proposition. Certain materials when consumed in relatively small quantities are "medicinal" while consumption in larger quantities can be detrimental (e.g. red wine). Alternatively, certain materials which are commonly present in food (e.g. vitamins) when provided in significantly greater quantities than is normally present in food can provide increased health benefits.

One such material where the latter appears to be true is cinnamon. Cinnamon is believed to act as an appetite suppressant as well as providing other health benefits when taken in a sufficient dose. Cinnamon is also currently used in a variety of food items such as cereals, breads, candies, and cookies as a flavoring. However, the inclusion of cinnamon in these foods as a flavoring is in a relatively small dose. While there may be some limited health benefit from ingestion of this cinnamon, flavoring, and not health benefits, is the primary purpose of its inclusion in these products and in most the percentage of cinnamon is insufficient to provide for any meaningful benefit without undue consumption of the food item.

In the utilization of cinnamon for health benefit, the cinnamon is generally separated from a foodstuff and provided in a more "medicinal" format such as a tablet. This is because the amount of cinnamon needed for health benefit is generally significantly more than would be used in a recipe. It appears that, to provide for medicinal benefit, cinnamon should be taken at a rate of 1 gram per day or greater. Typical dosage is then provided as two one-half gram doses, or one full gram dose, via a commercial capsule or tablet. These supplements are designed to be swallowed because they generally contain concentrations of cinnamon far in excess of the amounts used for flavorings. Such a dose is thought to act as an appetite suppressant as well as providing for other health related benefits specifically related to digestion. These benefits include, but are not limited to, improved glucose metabolism and improved blood sugar maintenance. Such a concentrated amount, if it was to be used as a flavoring, would often be overpowering for many traditional cinnamon flavored food items and give them an unpleasant taste with a heavy bitterness or tartness. It could also cause a burning sensation or choking response.

Cinnamon's use as a flavoring is well understood and while this can provide for a pleasant taste, the amount used for flavoring is generally in quantities either so limited as to not have a significant medicinal benefit when a normal amount of the foodstuff is consumed (for example one or two standard servings), or, if the foodstuff was consumed in greater amounts, the negative impact from consuming such a large quantity of the other materials in the foodstuff would generally counterbalance the medicinal benefit of the consumption of cinnamon and may introduce other health risks such as those present from consumption of an overabundance of calories and/or fat compared to the recommended daily intake for those items.

Many of the items made with cinnamon as a flavoring are also sweet and usually relatively high in calories. Therefore, eating large quantities of these foods will generally serve to counteract some or all of the cinnamon benefits or possibly pose undesirable health issues (including dental issues), especially if the product containing the cinnamon were to be consumed on a regular/frequent basis (e.g. daily or more than once daily), as would be necessary to gain some medicinal benefit from the cinnamon.

As one ready example, the consumption of cinnamon is believed to have appetite suppressant effects and assist in controlling blood sugar if consumed in amounts above 1 gram per dose. However, a foodstuff using cinnamon as a flavoring generally includes only a small percentage of cinnamon and also includes a relatively large amount of fats, sugars and other undesirable food elements which would counteract the nutritional benefit as an appetite suppressant and increase blood sugar by adding additional sugar to the diet. Consumption of such foodstuffs to gain the benefit of an appetite suppressant would therefore be generally contraindicated. Therefore, these products do not serve as an effective method for cinnamon delivery.

There has recently been a push to provide for supplements in a more consumable as opposed to medicational form. Children's chewable vitamins are a basic example of these which have existed for many years. Specifically, they have provided the supplement (in this case a vitamin supplement) in a form which is designed to be eaten and has an acceptable taste as opposed to simply being swallowed. This form is still, however, in many respects medicational. The product is not really a consumable "food" but is simply a tablet in a chewable form that then has an artificial flavoring added to cover the taste of the supplements.

The taste and consumption profile of these chewable tablets does not try to provide for a desirable consumption experience, but to disguise the "medicational" nature of the supplement in a form that is still essentially a tablet. Because of this, strong tasting artificial flavorings are commonly used and the structure is usually selected to provide for a minimal eating experience. In effect, the vitamins are simply made chewable to make them capable of being eaten by an individual who is likely going to be taste adverse to the straight supplement and is unable (or unwilling to attempt) to safely swallow a standard tablet.

Outside of chewable vitamin, a number of supplements have also tried to use food substrates as carriers. Many of these utilize placing the supplement into chocolate or into something that is effectively candy (e.g. a "gummy bear"). While this can make the supplement a desirable treat or snack and increase willingness to consume the supplement, in many cases the food support is detrimental to the user. In the case of such candies, the benefit of taking the supplement may be present, but consumption of these may have other negative effects (such as introduction of a large amount of refined sugar, fat, or caffeine).

Cinnamon and a number of other supplements (such as but not limited to ginger), can also have other significant problems in being used with the above food delivery systems. For one, they have very strong tastes and therefore when provided in a chewable form, the taste can overwhelm any flavoring designed to cover them up or provide for an unpleasant interactive taste. Further, cinnamon, in particular, has a benefit of having effects related directly to food consumption and digestion. This benefit is lost if the cinnamon is provided with too significant a food substance because the carrier, in effect, counteracts some or all of the cinnamon's benefit. Therefore, including cinnamon in a solid chocolate, high fat, or high carbohydrate carrier could, in fact, provide little to no benefit or even be detrimental to the desired purpose of taking cinnamon in the first place.

SUMMARY OF THE INVENTION

For these and other reasons there are described herein systems and methods for providing a nutritional supplement, specifically a supplement which is itself a desirable food product and does not introduce significant calories or other materials which could counteract the benefit of the supplement. The food product is generally designed to utilize the natural flavor of the supplement to enhance the food as opposed to trying to cover it and providing for a pleasant eating experience to allow for the supplement to act not only as a supplement, but also as a food substitute. There is also described herein a food product produced by such methods and systems.

In an embodiment of the invention, the resultant product balances the cinnamon ingredient with other ingredients so as to make the oral chewing and swallowing of a relatively large amount of cinnamon a pleasing experience, while at the same time minimizing in the food product materials which would serve to counteract the cinnamon's benefit to the consumer. Specifically, the food carrier is designed to be relatively low calorie while still tasting pleasant and providing an enjoyable eating experience. The food product provides a medicinal dose of cinnamon, while providing a sufficiently tasteful and complementary food product to the cinnamon taste along with keeping the detrimental health impact (that is total calories of consumption as well as consumption of negative food products such as fats and refined carbohydrates) of the food product to an acceptable low.

Though direct cinnamon taste may be diluted via the chew process, there are significant other utilitarian benefits of actually chewing and tasting a physical product in one's mouth versus bypassing this process by swallowing a capsule or tablet whole. Food products of the invention also possess enough bulk that parts of the product is swallowed without chewing action being present on each bit of cinnamon providing for consumption of a greater quantity without necessarily a corresponding increase in taste sensation.

Described herein, among other things is a composition of matter comprising: about 0.5 grams to about 3 grams of cinnamon per 20 grams of total matter by weight; precooked grain; and a low-glycemic sugar or mostly low-glycemic sugar.

In an embodiment of the composition the precooked grain comprises wheat such as, but not limited to, crushed shredded wheat or crushed wheat flakes.

In an embodiment of the composition the precooked grain comprises dehydrated cooked rice.

In other embodiments of the composition the cinnamon comprises Ceylon cinnamon, cassia cinnamon, or any combination of the two.

In embodiment of the composition, the low-glycemic sugar comprises honey, such as, but not limited to, agave honey and/or comprises sugar alcohol such as, but not limited to, xylitol and/or erythritol.

In an embodiment, the composition also comprises, molasses, bee honey, additional dry sweetener, ground ginger root, sea salt, vanilla extract, vanilla powder, nutmeg, cloves, and/or brown sugar.

There is also described herein a method of obtaining cinnamon by a human consumer the method comprising: providing a food substance comprising at least 2.5% by weight of cinnamon, having a human user consume the food substance by chewing the food substance.

There is also described herein a food substance for providing a medicinal dose of cinnamon wherein the cinnamon provide for an integral part of the flavoring of the food substance, the food substance comprising: at least 2.5% by weight of cinnamon; pre cooked grain; and a low-glycemic sugar; wherein the food substance has a weight of between about 10 to about 18 grams.

In embodiment of the food substance, the low-glycemic sugar comprises a sugar alcohol and/or a honey such as, but not limited to, agave honey.

BRIEF DESCRIPTION OF THE DRAWINGS

FIG. 1 Provides a flowchart showing the steps of an embodiment for manufacturing a food-based delivery system.

DESCRIPTION OF THE PREFERRED EMBODIMENT(S)

To-date consumers lack a cinnamon consumption option for the purposes of consuming cinnamon in quantities thought to be medicinal in a form that is palate pleasing (in terms of taste), interesting (i.e. in terms of a chew process), aromatic (i.e. in terms of a pleasing smell), convenient in terms of ease of quick use, ease of maintaining freshness for long periods and ease of daily availability in terms of keeping cinnamon on one's body for later consumption during the day. This can be especially true since cinnamon consumption during or after a meal is believed to be beneficial and is the recommended timing for cinnamon capsule consumption by many manufacturers. People consume many of their meals away from home or in other settings where adding cinnamon to the food/beverage they are consuming would require significant extra effort and likely provide for unpleasant taste interaction.

Because of this, in its preferred form, the food substance is a ready-made, easy-to-carry, delivery method/product—other than cinnamon capsules/tablets which lack some of the consumer satisfying "eating characteristics" since they are swallowed whole. Attempting to chew such tablets or capsules generally produces an undesirable dry, bitter, and tart taste and chew process and would generally be actively discouraged.

This disclosure will discuss a product which is generally referred to as a cinnamon supplement food product and a process and method for producing such a food product. The product is generally designed for consumption by humans and can be provided in a convenient to carry and consume ready-to-eat food substance incorporating a typical medicinal dose of cinnamon and having positive palate ratings in terms of taste and chewing sensations relative to other ready-to-consume medicinal cinnamon modalities. The food substance is also designed to not significantly negate the positive effects of cinnamon consumption, nor include any significant amount of ingredients known to be deleterious to good health if consumed in abundance, such as, but not limited to, fat, sugar, carbohydrates and sodium. In this way, the food product is designed to provide for health benefits for increased cinnamon consumption without introducing major deleterious health effects from consumption of the food substance.

It should be recognized that certain terms within this disclosure are intended to have certain meaning and are used specifically. This disclosure will discuss the cinnamon being provided as part of a foodstuff, food substrate, food product, food substance, or food. The term "food" is used herein to indicate that the cinnamon carrier is intended to be chewed and tasted, as opposed to being swallowed whole (in the manner of a tablet) or drunk. A food will generally be chewed and therefore ground into smaller pieces in the act of chewing, before being swallowed. This will also result in the food being tasted when it is chewed by an ordinary human user. Further, a food goes beyond a simple product which is just designed to be chewed. The product is designed to act as a food substitute having pleasant taste, chewing characteristics, and sufficient mass to feel satisfying to a human user, so as to potentially work as an alternative to a less healthy snack or dessert.

This product will also discuss a "medicinal dose" of cinnamon. This term is not meant to imply that the amount of cinnamon serves to provide any specific health change or cure, prevent, or inhibit any disease or symptom. This is intended merely to distinguish the amount of cinnamon from that necessary to be used as a flavoring. A medicinal dose is therefore intended to show that the product includes more cinnamon than is truly necessary to serve as a flavoring and that such an amount is currently believed, in light of current science, to provide for a health benefit. A medicinal dose of cinnamon will be considered an amount of at least 1 gram consumed in a single instance. Further, the food may be referred to as providing a cinnamon supplement. This again is not specifically intended to refer to nutritional supplements as defined by the Food and Drug Administration (FDA) but to indicate that the cinnamon is being provided in a level above that of a standard flavoring. The foodstuff discussed herein may, or may not, be classified as a nutritional supplement by the FDA This one gram may be provided in a single food substrate or may be provided on multiple substrates which are intended to act as a single "consumable dose." For example, the about 1 gram may be provided in a single food substrate bar, or may be provided across two substrate pieces, which, in combination, have similar weight to the bar. Generally, a serving of food substance will be an amount of between 16 and 35 grams, more preferably about 20-28 grams and still more preferably about 24 grams. This amount is generally about the normal serving size for packaged cookies or similar foods. Therefore it would be generally preferred for a single gram of cinnamon be provided in every 16-35 grams of food substance. It should be recognized, however, that the concept of a consumable dose does not require that that specific consumable dose be consumed in any sitting or over any time period. For that reason the ratio of about 1 gram of cinnamon may be present in every 16-35 grams of food substance, regardless of the amount of food substance which is to be consumed at any one time, in any time period, or in any one form as provided to a consumer.

As should be apparent from the above, a consumable dose refers to the amount of food substrate that the user is intended to consume in a single instance. As the food substrate provided herein is designed, in an embodiment, to act as a dessert substitute, the food substrate will generally be in the form of two small biscuits, cookies, or bars which are intended to be consumed together and therefore comprise a consumable dose. Further, the food substrate, in this way, can act as a substitute for alternative desserts and be consumed immediately following a meal (as is often recommended to gain medicinal effect from cinnamon). The use of multiple pieces in the single serving is preferred as it can make the consumption a longer task and the food substance to appear more substantial than if it was in a single piece. Further, the cookie form can provide for desirable substitution of the supplement and food substance for a food which generally has minimal health benefits.

In an alternative embodiment, the food substance can be assembled, but then be crumbled, crushed, or powdered and added to other food items (such as, but not limited to, acting as a topping for yogurt or salad) to provide for the same ratio of cinnamon to food substance ingredients. This method is generally not preferred at this time due to the potential introduction of extra calories from the underlying consumable on which the food substance is placed. However, for consumption of the product for certain individuals it may be desirable and provides for an alternative manner of consumption of the product.

The food item, as contemplated in an embodiment, comprises a cooked biscuit or "cookie" that is designed to provide for a medicinal dose of cinnamon, while at the same time avoiding the inclusion of undesirable food elements such as excess fat, excess simple carbohydrates, or unnecessary calories. It is further desired that the cookie be designed to be shelf stable under standard conditions for a relatively long period of time. In this way the term "cookie" is a bit of a misnomer because the food substance described herein does not include many of the hallmark ingredients of a cookie. However, as the food substance is designed to be eaten after a meal or as a satisfying snack, which can be used to curb future hunger and improve blood sugar load, reference to a dessert item such as a cookie is logical.

The cookie will generally include a medicinal amount of cinnamon. Generally, the amount will be selected to have about between 0.5 and about 1.5 grams of cinnamon per cookie with the idea of providing at least 1 gram of cinnamon in every consumable dose with a consumable dose comprising one to three cookies. Again, the preferred ratio of cinnamon is about 1 gram to about 16 to about 35 grams of food substance.

The cinnamon included may be any combination of available cinnamons but it is preferred that the resultant cinnamon comprise about 50% or more Ceylon cinnamon. Ceylon cinnamon has a generally milder taste than more common cassia cinnamon. By keeping the percentage of Ceylon cinnamon higher, the resultant taste is often more pleasant. However, cassia cinnamon is generally significantly cheaper to produce and may include unique health benefits not present in Ceylon cinnamon. Therefore, the two may be intermixed to provide for a more cost effective production scheme, a different supplement profile, and a slightly different taste. Further, it should be recognized that while use of a mixture of cinnamons is preferred, it is by no means required and the cookie may be made with 100% cassia or 100% Ceylon cinnamon or with any other cinnamon or combination of cinnamons which may or may not include either of the above.

The food substrate into which the cinnamon is added will generally include a number of other ingredients. As the substance is designed to be a food which is eaten as a dessert substitute, it is desirable for the substance to be able to provide a 16-35 gram serving size common in desserts.

In order to provide mass and texture, the food substrate will generally include various grains which are generally crushed or pulverized. The exact size of the resultant particulate material is not specifically required, but in a preferred embodiment the grains will generally be larger than about 0.5 mm in major dimension (about the size of a grain of salt) and smaller than about 7 mm in major dimension (about the size of a grain of rice). However, at least a portion of the grain is preferably a flour and often a gluten free flour (such as a bean flour) because it is believed that inclusion of such a material can assist with the binding. Use of a gluten free flour is generally preferred as it can result in a stiffer and chewier product. Flours will generally have a grain size smaller than crushed particulate grains, but that is by no means required or necessary. It is also generally preferred that fat free flours be used.

In an embodiment, it is preferred that the grain mix include mostly or exclusively grains which are cooked prior to addition to the food substrate mixture as this can improve shelf life and texture. Precooked flours may be used, however, in one embodiment, other precooked grains and grain mixtures (such as cereals) may be crushed and utilized. In an embodiment, the principle grain will be wheat since it generally is shelf stable once cooked however grains such as oats, corn, rice, barley, millet, flax, hemp, or other grains may be included or substituted. Further, it is generally preferred that a mixture of grains and/or grain forms be used and not a singular grain form alone. Use of a single grain can result in the product having an undesirable texture which is more uniform and lacks distinctiveness and which provides a less pleasant eating experience than if a variety of grain forms are used.

In an embodiment, the same grain can be used in multiple forms. Specifically, wheat can be partially supplied in a shredded or ribbon form (such as in shredded wheat cereals) which is crushed after cooking and partially in flake (molded) form (such as in crushed Wheaties™ and Weetabix™ cereals) which is crushed after cooking. These can be combined as the forms generally have different textures.

In a still further embodiment, the cookie includes precooked dehydrated rice as a further grain. This type of product is commonly sold as Minute Rice™ or Instant Rice™ and comprises rice which has been cooked and then dehydrated. The rice is generally not rehydrated prior to being placed in the mixture but is placed in dry form where it provides a slightly chewy texture.

There will generally also include a binder and sweetener. So as to avoid refined white sugar and the attendant caloric and glycemic load, it is preferred that low-glycemic sugars be used. In an embodiment, these include sugar alcohols (or polyols) such as xylitol, erythritol, or sorbitol be utilized. In another embodiment, low glycemic sugars such as honeys (e.g. Agave Honey) may be used as a low glycemic sugar. These low glycemic sugars are generally used in combination. It should be recognized that it is not necessary for the resultant food to be low glycemic, but it is generally preferred that excess or unnecessary glycemic load is avoided.

Sugar alcohols are generally preferred to be included (either alone or in combination) since they are generally considered to have little to no effect on blood sugar or insulin levels. As such, their inclusion provides for sweeteners and therefore improved taste without serving to increase blood sugar and therefore potentially cancel out the expected benefit of blood sugar regulation from the cinnamon intake.

In an embodiment, the sugar alcohols are provided crystallized as dry sweeteners. However, they may be used in liquid form in an embodiment. In an embodiment, liquid sweeteners such as honey and molasses also act as a binder. In alternative embodiments, the dry sweetener may be removed and additional wet sweetener may be used or vice versa. Further, other sugar alcohols or sugars may be added in a liquid or crystallized form.

The honey is preferably a combination of agave and bee honey although other honeys or combinations of honey may be used. Agave honey and many similar sweeteners are desirable to be used as they also provide for a relatively low glycemic load and therefore may be considered low-glycemic sugars. Alternative sweeteners such as Agave or other honeys alone or in combination with sugar alcohols are often preferred as consumption of large quantities of sugar alcohol has been known to cause diarrhea and gas. Therefore, it is preferable that the product have less than 15% sugar alcohol by mass and more preferable that it have less than 10% sugar alcohol by mass.

The binders are generally preferred to be heat activated and serve to alter their structure once exposed to heat. These are often sugars which can change crystalline structure after being heated. The food substance will generally not use binders that work best at room temperature since those are often insufficient to create a desirable resultant texture.

As contemplated above, some of the sweeteners will comprise liquids and some solids. It is generally preferred that about 25% to about 40% of the total ingredients (by mass) comprise liquids to provide for a resultant product which is moldable. In an embodiment, it is preferred that about 34% of the materials be liquid with the rest being solid. This is generally believed to be a lower percentage of liquids than is common in many cookie mixtures which results in a mixed dough which is more crumbly until being heated.

As is understood by those in the art, materials which lack sufficient liquid may not suitably bind, even when exposed to heat, which can result in the cookie being overly crumbly, therefore reducing the liquids to below 25% is generally undesired. At the same time, increasing the percentage of "wet" ingredients (that is, ingredients including water) is generally undesirable as it makes the resulting product also lack structure. It is generally desirable, to maintain a relatively low glycemic load and enhance the effectiveness of the cinnamon, that the food substance comprise less than about 25% sugar with less than about 10% sugar alcohol with around 20-40% of the sugar being sugar alcohols.

In addition to the above, a number of flavoring ingredients may also be included to provide for improved flavoring. As should be apparent, the principle flavoring is the cinnamon itself and therefore additional flavorings are generally provided which complement the flavor of cinnamon. As opposed to the cinnamon, however, these are not added in medicinal dose quantities and are provided solely for flavoring. Generally, there will be at least 6 times the amount of cinnamon included as there would be of any such flavoring. Some flavorings which can be used are vanilla extract, vanilla powder, nutmeg, cloves, salt, brown sugar, ginger, chocolate, mint, or any combination of these. However, none of these are required to be included.

The resultant product is generally produced in an embodiment in the following manner as shown by the flowchart of FIG. 1. Initially, cereals and other dry products are crushed to provide for particles of desired size (101) as discussed above. As discussed above, most if not all of the grain ingredients will be precooked prior to this step.

Cinnamon is also generally crushed or ground into a fine powder form in step (103) as is standard for ground cinnamon. However, it is preferred that the cinnamon be ground non-uniformly allowing for larger pieces to be present. In this way the flavor may be decreased across the food as a whole when compared to using finely ground cinnamon.

However, larger pieces may also provide for a distinctive taste sensation when the person actually crushes one of the larger pieces by the chewing action. It is believed this can provide for unique taste without making the cinnamon taste overly strong. Once the dry products are all at an acceptable size, they are mixed together with other dry ingredients including the dry sweeteners and any dry flavorings which are being included.

Liquid materials are mixed together in step (105) along with uncooked gluten-free flour but not the other dry ingredients. However, in an alternative embodiment, the flour may be added to the dry ingredients as may some of the slight dry ingredients such as the flavorings. Adding these to the liquid mixture can assist in making sure they are more evenly distributed throughout the resulting mixture. It may be necessary to heat the liquid mixture (107) at this stage to provide for a sufficient fluid state to allow for intermixing with dry ingredients although, depending on the exact ingredients used, this may not be necessary. The liquid materials should have a generally fluidic state prior to continuing.

The dry materials are then added to the liquid materials in step (109) to form a generally uniformly dispersed mixture. The mixing may be performed at room temperature or slight heat may be added to maintain a fluidic viscosity to allow the material to be stirred relatively easily and form a fairly uniform dispersed mixture.

The mixture is then molded into a desired shape and size in step (111). As discussed above, it is generally preferred that the food substrate be formed into cookies or biscuits with two of such comprising an intended serving. Such formation can be based simply on making sure that the desired amount of cinnamon is expected to be present in each subdivision of the mixture So, for example, if the mixture includes 10 grams of cinnamon uniformly distributed, one would expect that the mixture would be formed into 20 cookies so as to have about 0.5 grams of cinnamon per cookie. However, other methods may be used as is understood by those of ordinary skill. Ingredients are generally selected so as to provide each resultant cookie (which includes about 0.5 grams of cinnamon) to have a total weight of about 10-24 grams at precooked levels, generally around 10-18 grams, and preferably around 12 grams. Therefore, the cinnamon comprises around 2.5% or more of the total weight of the cookie, an amount far exceeding what is traditionally used as a flavoring. Each cookie will generally comprise about 5 grams or less in sugar, with the remaining composition comprising mostly grains with relatively trace amounts of flavorings and incidental materials (such as residual water).

Shape of the cookies is irrelevant and any conventional shape may be used. In an embodiment they may be formed into flat rounds or half domes which are standard cookie shapes. However, in alternative embodiments they may be formed into bars. In a still further embodiment, to assist with mechanical packaging, the mixture may be baked in a generally continuous flat sheet which is cut into desired shapes after baking.

It should be recognized that in an embodiment, the cookies may be formed under significant pressure. In an embodiment, the pressure is sufficient to provide for binding of the mixture together and the baking step may be eliminated completely. This is generally not preferred, however, and generally the pressure is simply sufficient to provide for the mixture to have a sufficiently rigid structure to survive transfer to the baking process without breaking apart.

Once the mixture is arranged in the desired form for baking, it is generally baked in step (113) if baking is desirable for binding. As the raw ingredients do not include any which generally must be cooked to provide for elimination of potentially harmful bacteria (such as eggs) assuming sufficient cleanliness is maintained in the assembly process, the principle purpose of baking is to activate binders by the application of heat. For this reason the baking process may be insufficient to sterilize the products or to "cook" any ingredients.

In an embodiment, the heating is at relatively low temperature, such as between 150 and 300 degrees Fahrenheit, more preferable around 250 degrees Fahrenheit. Heating occurs for around 5-30 minutes, more preferably about 5-15 minutes, and more preferably about 10 minutes at about 250 degrees Fahrenheit. The resultant cookie in this cooking scheme has a moister texture while still having a relatively stiff exterior to provide for strength and binding and to inhibit breakage in transport and crumbling when being handled. However, in alternative embodiments a wide variety of baking values can be used ranging from about 30 minutes at about 150 degrees to about 5 minutes at about 300 degrees. In still further alternative embodiments, the mixture may be heated at much higher temperatures (e.g. those above 400 degrees Fahrenheit) for much shorter periods of time. The exact cooking time and temperature depends on the desired resultant texture with lower temperatures generally providing a moister product and higher temperatures providing a crispier product. Further, if the food substance is designed to be crumbled, it may be baked longer to allow for a drier product more easily crumbled either mechanically or by hand.

Once baking is complete, cookies are generally allowed to sit and cool at about standard room temperature and humidity to allow them to absorb environmental moisture for about 12-48 hours (115). As opposed to many traditional cookies, where being served above room temperature can enhance texture by weakening binders (making them "soft" or "gooey"). These cookies generally appear to benefit from being allowed to stabilize at room temperature and humidity. Alternatively, similar resultant exposure under different environmental conditions may be provided to have the same result. The cookies are then generally packaged in airtight containers, possibly with nitrogen gas being infused in packaging, to inhibit any spoilage and provide protection for transportation.

While airtight packaging is desired, it should be recognized that the preferred ingredients used are generally only minimally responsive to spoiling and rancidity even without refrigeration or other preservation. Cinnamon itself also can serve to act as a preservative for the cookies. Therefore, airtight packaging is mostly preferred to prevent outside contamination from being introduced to the cookie, to provide for enhanced shelf life, to provide ruggedness for transportation, and to improve product appearance.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A farinaceous composition of matter comprising:
  0.6 grams to 3 grams of ground cinnamon per 20 grams of total matter of said farinaceous composition by mass;

at least 4 grams of grains per 20 grams of total matter of said farinaceous composition by mass; and a low-glycemic sugar;

wherein said farinaceous composition is formed as a finished comestible for direct human consumption from a mixture of said ground cinnamon, said grains, and said low-glycemic sugar; and wherein said farinaceous composition has a mass between 16 and 35 grams.

2. The farinaceous composition of claim 1 wherein said grains comprise wheat.

3. The farinaceous composition of claim 2 wherein said wheat includes crushed shredded wheat.

4. The farinaceous composition of claim 2 wherein said wheat includes crushed wheat flakes.

5. The farinaceous composition of claim 2 wherein said grains comprise dehydrated cooked rice.

6. The farinaceous composition of claim 1 wherein said cinnamon comprises Ceylon cinnamon.

7. The farinaceous composition of claim 6 wherein said cinnamon also comprises *cassia* cinnamon.

8. The farinaceous composition of claim 7 wherein said cinnamon comprises Ceylon cinnamon and *cassia* cinnamon in an approximately equal ratio.

9. The farinaceous composition of claim 1 wherein said cinnamon comprises *cassia* cinnamon.

10. The farinaceous composition of claim 1 further comprising molasses.

11. The farinaceous composition of claim 1 wherein said low-glycemic sugar comprises agave nectar.

12. The farinaceous composition of claim 1 further comprising bee honey.

13. The farinaceous composition of claim 1 further comprising an additional dry sweetener.

14. The farinaceous composition of claim 1 wherein said low-glycemic sugar comprises sugar alcohol.

15. The farinaceous composition of claim 14 wherein said sugar alcohol comprises at least one of sugar alcohols selected from the group consisting of xylitol and erythritol.

16. The farinaceous composition of claim 1 further comprising at least one flavoring selected from the group consisting of: ground ginger root, sea salt, vanilla extract, vanilla powder, nutmeg, cloves, and brown sugar.

17. A method of obtaining cinnamon by a human consumer comprising:

providing a farinaceous composition comprising at least 3.0% by mass of ground cinnamon; wherein said farinaceous composition comprises a mixture including said cinnamon, grains, and a low-glycemic sugar; and having a human user consume said farinaceous composition by chewing and then swallowing said farinaceous composition.

18. A cookie for providing a medicinal dose of cinnamon wherein the cinnamon provides for an integral part of the flavoring of the food substance, the cookie comprising:

at least 3.0% by mass of ground cinnamon;

at least 20.0% by mass of grains; and a low-glycemic sugar;

wherein said cookie is formed as a finished comestible for direct human consumption from a mixture of said ground cinnamon, said grains, and said low-glycemic sugar;

wherein said mixture is placed under pressure and heat to form said cookie; and wherein said cookie has a mass between 16 and 35 grams.

19. The cookie of claim 18 wherein said low-glycemic sugar comprises a sugar alcohol.

20. The cookie of claim 18 wherein said low-glycemic sugar comprises a honey.

* * * * *